United States Patent [19]

King, Sr.

[11] Patent Number: 4,662,387

[45] Date of Patent: May 5, 1987

[54] INLINE DISPERSAL VALVE

[76] Inventor: Lloyd H. King, Sr., 5222 Green Farms Rd., Edina, Minn. 55436

[21] Appl. No.: 783,615

[22] Filed: Oct. 3, 1985

[51] Int. Cl.[4] .............................................. B01D 11/02

[52] U.S. Cl. .................................... 137/268; 422/282

[58] Field of Search ................ 137/268; 422/261, 263, 422/281, 282

[56] References Cited

U.S. PATENT DOCUMENTS

| | | | |
|---|---|---|---|
| 2,604,446 | 7/1952 | Palmer | 137/268 X |
| 3,901,262 | 8/1975 | Gutkowski | 137/268 X |
| 3,929,151 | 12/1975 | Rubin | 137/268 |
| 4,094,383 | 6/1978 | Thrasher | 137/205.5 X |
| 4,250,910 | 2/1981 | King | 137/268 |
| 4,548,227 | 10/1985 | Regunathan | 137/268 |

FOREIGN PATENT DOCUMENTS

| | | | |
|---|---|---|---|
| 635811 | 3/1982 | Italy | 137/268 |

*Primary Examiner*—Alan Cohan

*Attorney, Agent, or Firm*—Jacobson and Johnson

[57] ABSTRACT

An inline dispersal valve is constructed with a chamber into which a material to be dispersed into a fluid stream may be inserted. A first fluid deflector is used to direct fluid away from the fluid stream into the chamber to permit the fluid to absorb the dispersant, and a second fluid deflector, oppositely facing, that directs the fluid back into the fluid stream after it has passed through the chamber. The bottom of the chamber has a pair of openings in a line with each other which have an axis that is substantially normal to the axis of the fluid flow in a main stream. A rotatable plate having a pair of apertures of a specially designed tear drop shape controls the amount of fluid that flows through the chamber in accordance with the amount of available area to the fluid stream due to the alignment of the apertures with respect to inlet and outlet ports, respectively. The plate which contains the apertures is preferably a circular disc which carries a curved row of rack teeth. In one embodiment the rack teeth mesh with a spur gear which is coupled to a shaft that has a control knob on its outer end. As the control knob is rotated the spur gear rolls along the curved rack, causing the control plate to rotate. In a second embodiment a control plug is directly attached to the apertures such that when the plug is rotated the amount of fluid exposed to the apertures is increased or decreased directly and a chemical canister which may be keyed to the housing to prevent insertion of improper chemicals into the dispersal valve.

11 Claims, 14 Drawing Figures

10
52
61
53
54
50
63
65
67
69
55
57
1
1
17
15
14
9
9
9
9
60
19
19
25
18
15
16
24
24
11
12
30
40
20
31
42
44
41
43
13
13

INLINE DISPERSAL VALVE

BACKGROUND OF THE INVENTION

The present invention relates to dispersal valves for dispersing materials such as bromine and chlorine from solid tablets for use in swimming pools, hot tubs, spas and the like.

Inline dispersal valves for controllably dispersing material into a fluid stream are shown in U.S. Pat. Nos. 4,270,565 and 4,331,174, both of which issued in the name of Lloyd H. King, Sr., the inventor of the present application. In these prior inline dispersal valves, the control was obtained by lowering and raising a container which had a plurality of apertures in it so that more or fewer apertures would be presented to the fluid stream flowing through the pipeline to which the valve is attached. While effective, the adjustment mechanism and the construction of the valve are not as simple or controllable as is the valve of the present invention and therefore, for certain applications, the valve of the present invention is to be preferred.

In the Sebald, et al. U.S. Pat. No. 2,481,882 a flow deflecting structure is presented to the fluid stream pipeline which deflects this stream toward a sight glass where the fluid stream then flows through the sight glass, reverses direction and passes out through a deflecting portion that faces in the direction opposite to the fluid flow of the main stream. A plug valve which is rotatable to close off the path into and out of the sight glass is coupled between the sight glass and the main fluid stream.

The present invention employs a fluid deflector which is inserted into the main fluid stream to deflect the fluid into the chamber. However, the chamber in the present invention contains a solid dispersant material and the diverted stream flows over the solid material to dissolve some of it into the stream, and then merges back in with the main stream. A second fluid deflector faces in the direction opposite the flow of the stream.

There also is a control regulator in the present invention which is designed so that a precise control of the amount of fluid flowing over the solid dispersant material is obtained. The construction of this control regulator of the present invention is designed to provide high efficiency and effectiveness.

The Russell U.S. Pat. No. 2,986,940 shows a pair of fluid taps which sample the liquid in a fluid line in a spool valve in order to shut off the flow of fluid through the fluid taps.

The Diederich U.S. Pat. No. 3,803,921 shows a probe extending into the flow stream of a pipe. The probe extends diametrically across the pipe and has the fluid tap located in the probe. The probe has a plurality of laterally spaced openings facing the flow to sample the flow. A pipe is located in the probe to remove fluid and a second return pipe is located behind the probe.

The Thompson U.S. Pat. No. 3,625,056 shows a single probe that operates to withdraw fluid from the main stream and return the fluid to the main stream after the level of contamination in the fluid has been measured.

The Aegidius U.S. Pat. No. 3,995,495 shows an apparatus for taking an average sample of milk which is proportionately sampled from the yield of the milking of a cow wherein the probe has a tapered shape.

The Edwards, et al. U.S. Pat. No. 2,050,565 shows a proportional fluid feeding device which has a liquid storage tank and a movable float control.

The Lazell U.S. Pat. No. 3,355,946 shows a pair of pitot tubes in a fluid stream for measuring fluid velocity in terms of pressure differential.

The Cook U.S. Pat. No. 3,726,304 shows a fertilizer dispenser which has a tank with a bladder in it. Fluid in a pipestream is forced against the outside of the bladder while fertilizer passes through a filter and into the inside of the bladder and then out a separate flow path into the main water stream.

The Wagner French U.S. Pat. No. 1,004,421 shows a system for increasing the pressure of a gas flowing in a fluid stream by passing a portion of the gas through a blower to increase the pressure and then through a regulator and back into the fluid, or gas, stream.

SUMMARY OF THE INVENTION

The aperture of the present invention receives a quantity of a solid dispersant material in a chamber and includes a pipeline that carries a main fluid stream, a first fluid deflector that has an inlet which is constructed to direct a portion of the fluid in the main stream through a chamber in which the dispersant material is held and a second fluid deflector which directs the fluid out of the chamber after it has washed over the solid dispersant material so as to dissolve some of the material into the stream. An outlet directs the secondary stream back into the main stream with the same direction of flow as the main stream. A control mechanism is used which is capable of blocking off the available secondary stream flow through the first and second deflectors and into the chamber, which is constructed to carefully regulate the amount of dispersant that is added to the main stream by controlling the available flow area of inlet and outlet ports that lead to the chamber. Because of its symmetry the invention permits use in either flow direction.

BRIEF DESCRIPTION OF THE DRAWINGS

The present invention is described by reference to the drawings in which.

DESCRIPTION OF THE INVENTION

Figure 1:
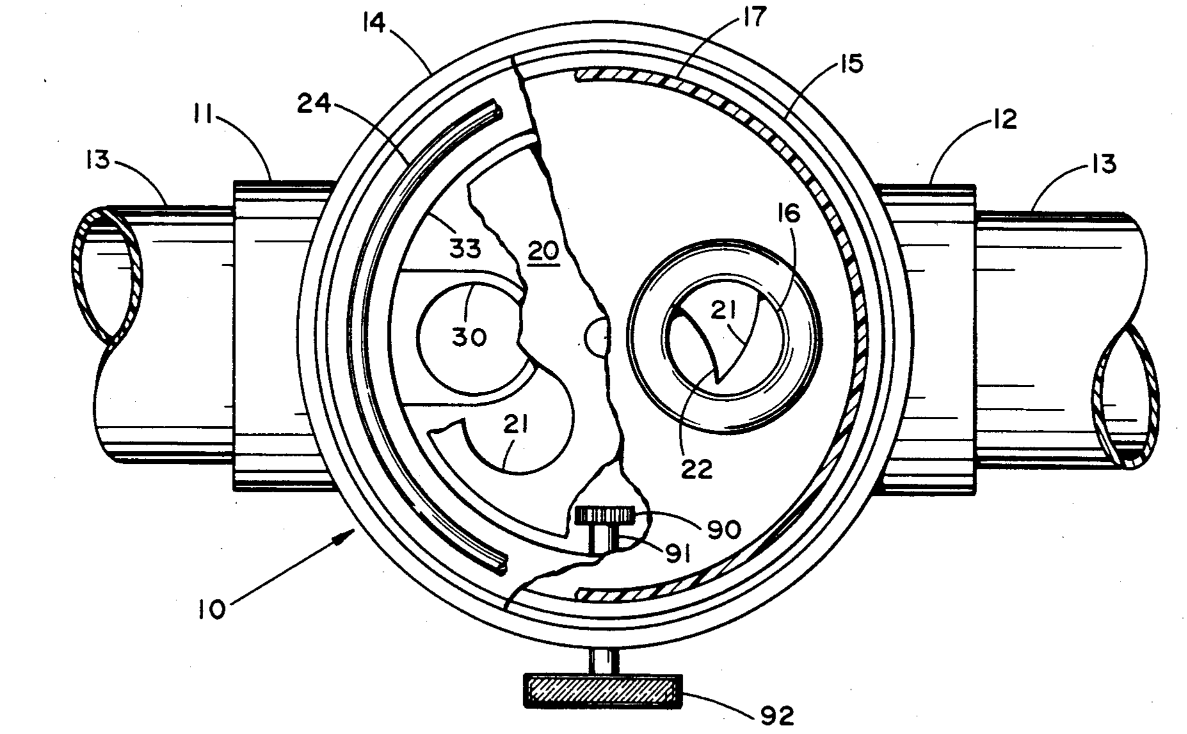
FIG. 1 is a partial cut-away top view of the inline valve of the present invention (taken along the line 1—1 of FIG. 3)
Figure 2:
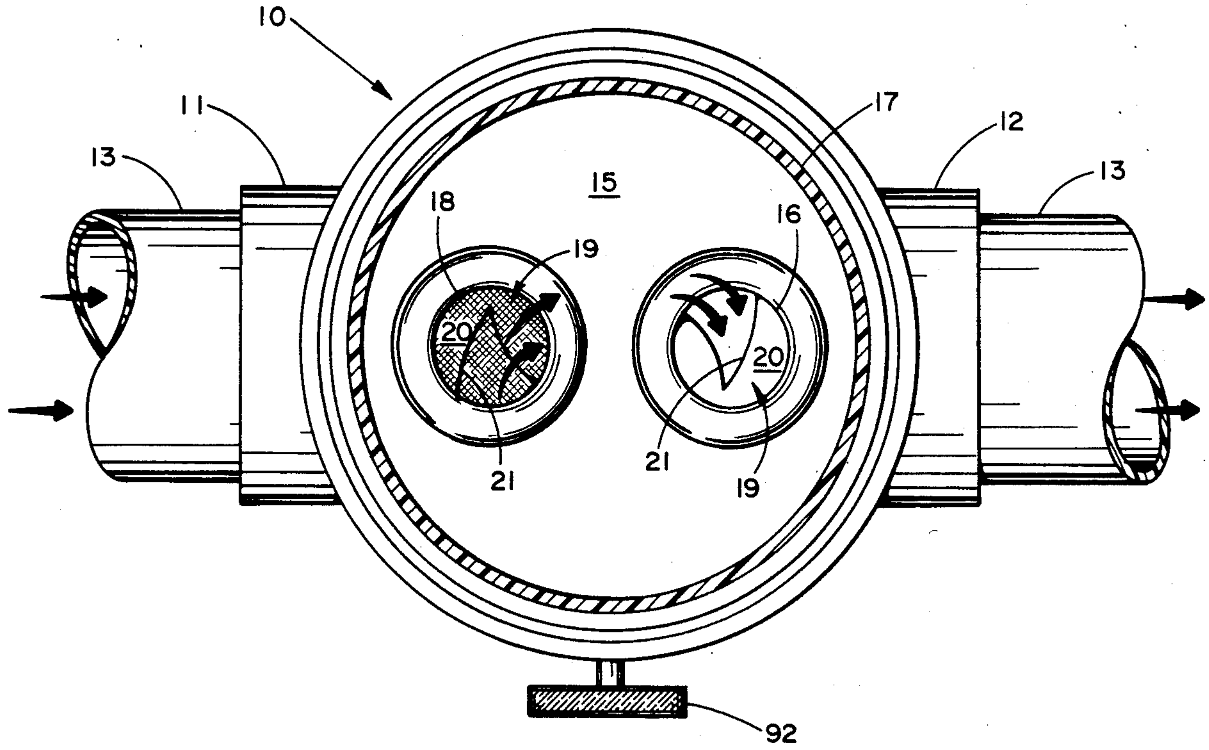
FIG. 2 is a top view of the valve with one of the ports screened (taken along the line 1—1 of FIG. 3)
Figure 3:
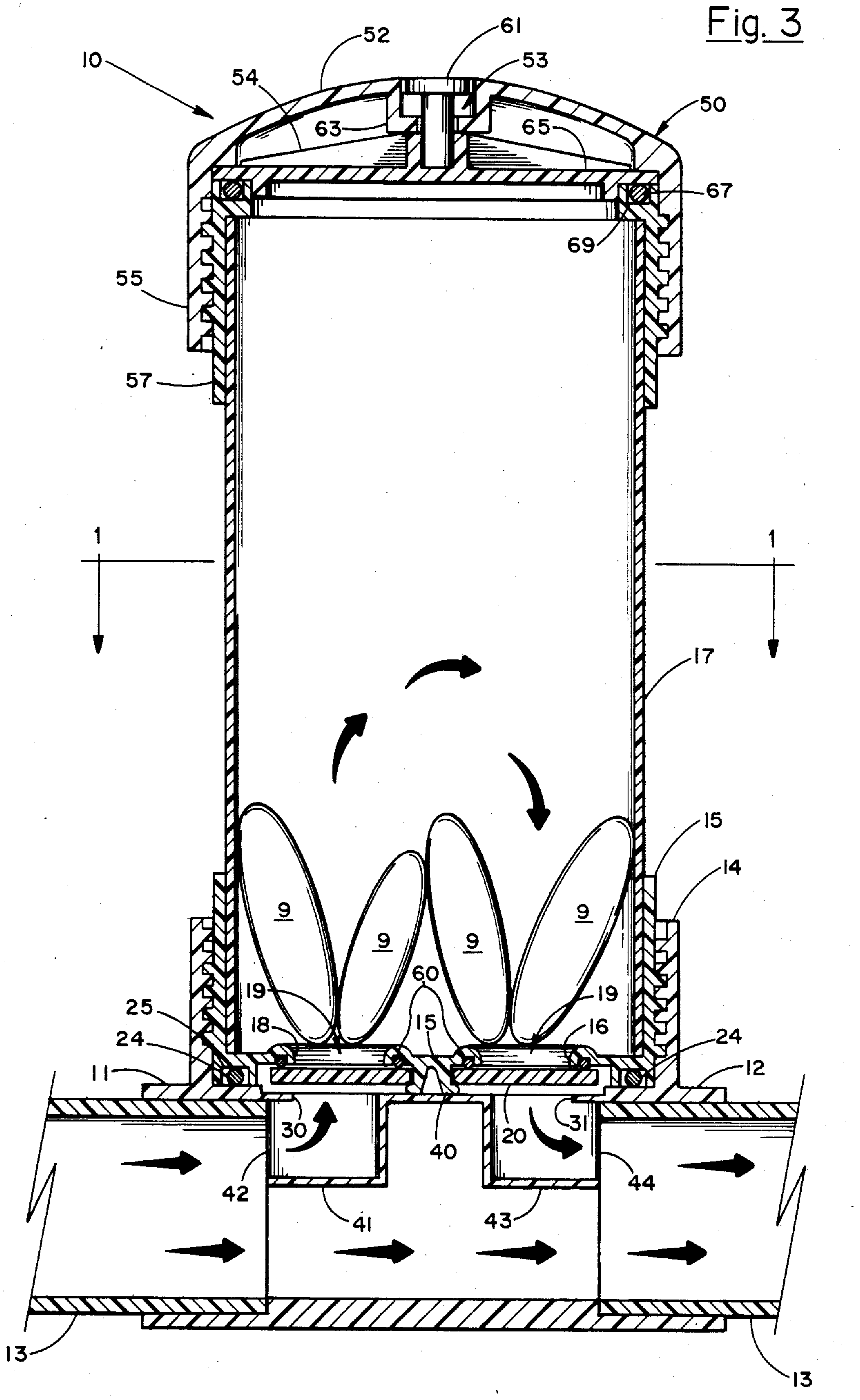
FIG. 3 is a side sectional view of the valve which shows the pipeline and the dispersant chamber.

An inline dispersal valve for solid dispersant 9 constructed in accordance with the present invention is shown by reference to the drawings in which FIGS. 1-3 of the drawings show a dispersal valve 10. The dispersal valve 10 includes an input connecting pipe 11, an output connecting pipe 12, and a vertical collar 14, all of which are integrally formed as one part. The pipes 11 and 12 are of a slightly larger diameter than the pipe that carries the water through the system as shown in FIGS. 1 and 2. The input pipe 11 and the output pipe 12 may be connected to the system pipe by means of threaded connections, adhesive or any other suitable type of connection. The vertical collar 14 has internal threads formed thereon which mate with threads on a base ring 15 that extends upwardly beyond the upper edge of the collar 14.

The base ring 15 may be secured to, or integrally formed with, an elongated, vertically oriented chamber 17 that holds the material that is to be dispersed, which may be bromine or chlorine tablets of the type conventionally used for swimming pools, spas, hot tubs and the like. The base ring 15 has a pair of raised circular ridges 16, 18 which encircle the port apertures 19 which have axes normal to the main fluid stream and through which the fluid flows during operation of the system. The ridges 16, 18 are semicircular in cross-section as shown best in FIG. 3. Different lengths of chambers may be interchanged if different capacities are required, while employing the same components.

Figure 4:
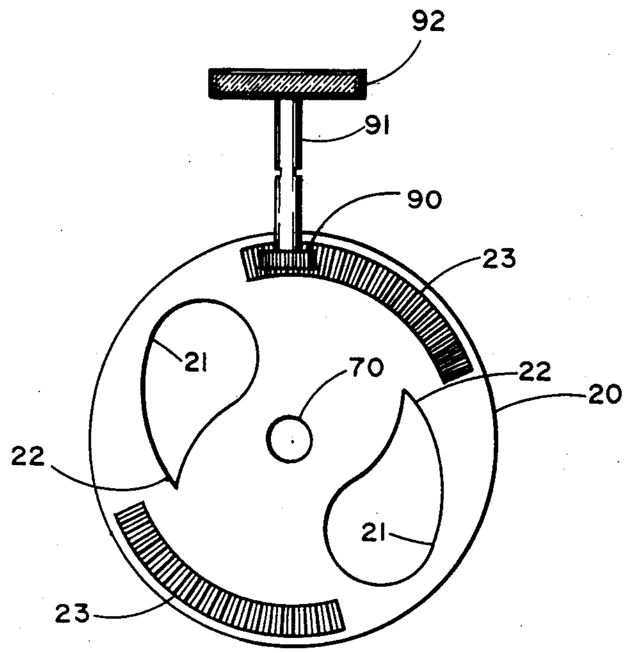
FIG. 4 is a bottom view of the control plate, and control shaft and knob.

A control plate 20 is illustrated in FIG. 4 which has a pair of teardrop-shaped apertures. The control plate 20 is located below the bottom of the base ring 15 so that the bottom of the base ring also provides the bottom of the dispersant chamber. The amount of fluid that flows through the port apertures 19 is controlled in accordance with the total area that is available to fluid flow as a result of the alignment of the control apertures 21 and the port apertures 19. The plate 20 has a curved gear-rack 23 inserted into it or formed on it. The adjustment of the position of the control apertures 21 with respect to the port apertures 19 will be described subsequently in more detail. A circular O-ring 24 is provided in a cavity 25 formed on the bottom of the base ring 15 to provide a seal between the base ring 15 and the input and output pipes 11, 12, respectively.

A locking fastener 40 is integrally formed with the bottom of the base ring 15 so that it projects downwardly between the ridges 16, 18 and through an opening in the center of the control plate 20. The control plate 20 is thereby retained in place with sufficient clearance so that the plate may slide over the locking structure without binding as it is rotated to obtain the desired fluid flow control. The details of the locking fastener 40 are described in more detail subsequently in connection with FIG. 5 of the drawings.

As shown in FIGS. 2 and 3, fluid enters the system through the system pipe 13 from the left, where the black arrows indicate the flow of the fluid. Flow then is deflected through the fluid inlet 42 of the inlet passageway 41 that faces into the fluid flow. The fluid inlet 42 receives the fluid and causes it to be directed upwardly through the left-hand inlet port aperture 19 into the lower portion of the chamber 17. The fluid then flows over the solid dispersant material 9 which dissolves into the fluid stream in a controlled manner. The amount of dispersant which is to be dissolved is controlled by the areas that are provided by the alignment of the port apertures 19, and the control apertures 21 in the control plate 20. After flowing over the material to be dispersed, the fluid flows down again as indicated by the black arrows, past the right-hand port outlet aperture 19 and down through the outlet passageway 43 to the fluid outlet 44, which faces in the direction away from the incoming fluid. The orientation of the inlet 42 and the outlet 44 produces a high fluid pressure at the inlet and a low fluid pressure at the outlet.

The top of the chamber 17 is preferably closed by a cap 50 to prevent fluid from flowing out of it and to prevent gasses from escaping out of the feeder. The cap 50 preferably has a domed section 52 with a recess 53 that is formed in the center of the dome, and internal support ribs 54. A downwardly depending sidewall 55 is formed on the side of cap 50 which has threads that mate with a top ring 57 that is secured to the chamber walls 17 to lock the domed cap 50 to the closure plate 65. An O-ring 67 is provided in a cavity 69 in the top ring 65 to provide a seal between the closure plate 65 and the top ring 57. The raised boss 63 receives a support pin 61 that allows the cap 50 to be supported firmly on the closure plate 65.

Figure 5:
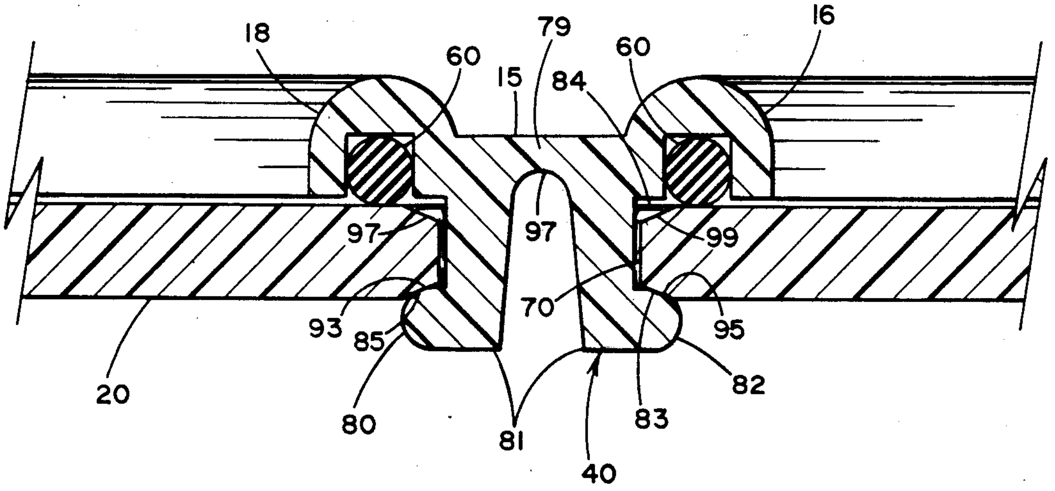
FIG. 5 is a partial cross-sectional view of the locking fastener that is formed integrally with the bottom of the dispersant chamber and the control plate.

The manner in which the control plate 20 is secured and held into place by the securing mechanism is described in more detail by reference to FIG. 5. The control plate 20 has a central aperture 70 located in it to receive the locking fastener 40 which has a pair of feet 80, 82 which extend in opposite directions. The feet 80, 82 are joined by a bridge 79 of reduced cross-sectional area which permits flexing of the feet 80, 82 inwardly so as to allow the aperture 70 of the plate 28 to slide over them. After the plate 20 is positioned over the feet 80, 82 they are released and the curved toes 85, 83 spring into engagement with the sloped walls 93, 95 on the bottom of the plate 20.

Additional pairs of sloped walls 97, 99 may be provided to aid the assembly of plate 20. The plate may be inserted either as shown, or in an 180° reversed position. In order to provide for this reversibility, it may be necessary to provide a second gear-rack 23 on the opposite side of the control plate 20. The heels 81 of the feet 80, 82 are joined together by a curved surface 97 that allows the feet to be resiliently bent in and out without cracking of the material, which preferably is a plastic or other resilient material from which the base ring 15 is formed.

To control the adjustment of the plate 20, and hence the position of the tearshaped control apertures 21 relative to the port apertures 19, a spur gear 90 is provided on the end of a shaft 91 which is connected to a control knob 92. As the control knob is rotated, the plate 20 also rotates so that different amounts of the combined areas of the control apertures 21 and the circular port apertures 19 will be in alignment with each other. The shaft 91 extends to the curved gear-rack 23 of the chamber 17 and is mounted for rotation therein.

Figure 6:
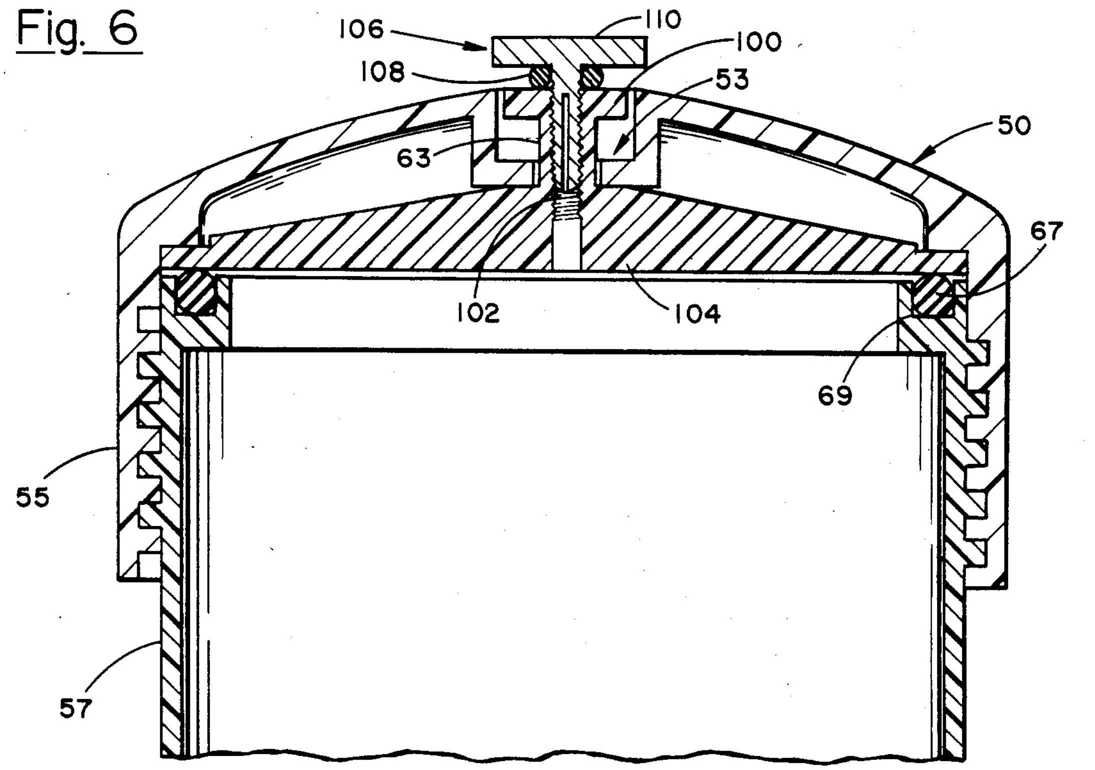
FIG. 6 is a partial side cross-sectional view that shows alternate version of a closure cap for the valve.
Figure 7:
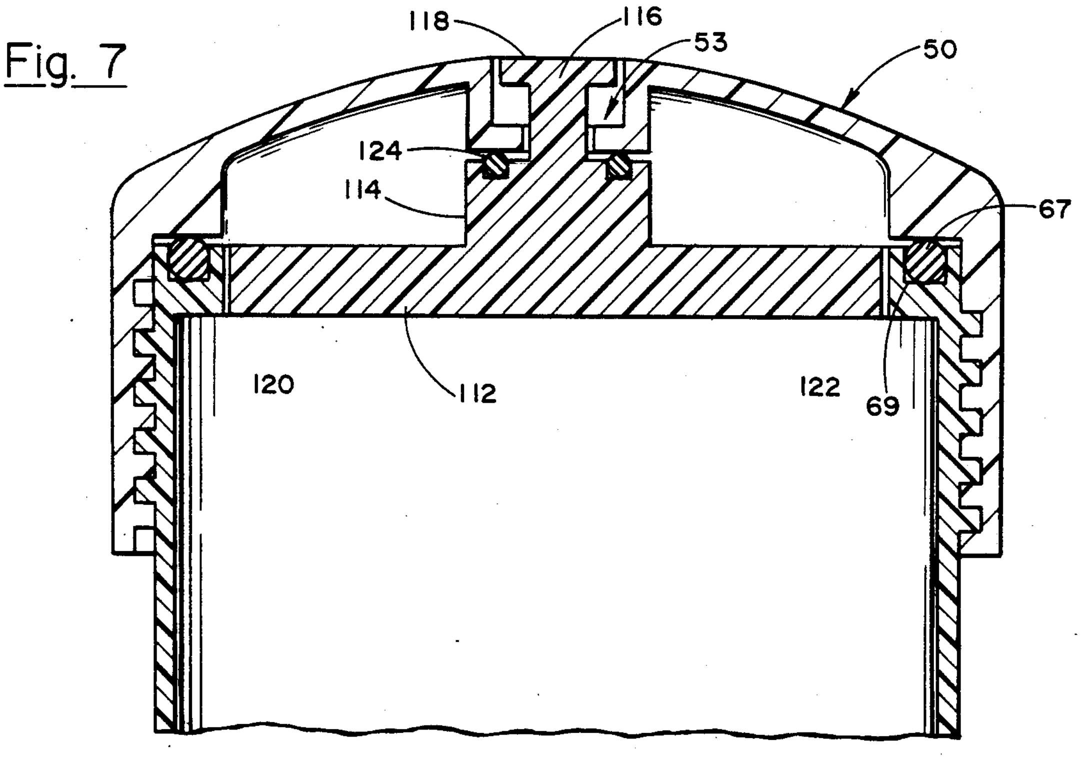
FIG. 7 is a partial side cross-sectional view of a further alternate version of a closure cap for the valve.

FIGS. 6 and 7 show alternate embodiments of dispersant material-containing chambers, and caps for closing them off. In FIG. 6 a threaded boss 63 extends upwardly into the recess 53 and has an upper rim 100 which substantially closes off the recess 53. A valve seat 102 is located in the closure member 104 and a pressure release valve 106, which mates with the valve seat, is threaded into the threads of the boss 53 so as to close the valve seat 102 when it is threaded fully into the boss, and so as to relieve pressure when the valve seat is threaded out of the boss.

An O-ring 108 is preferably located below the head 110 of the pressure release valve 106 to seal the space between the ring 100 and the head 110. In FIG. 6 where components are similar to those previously described in FIG. 3 the same reference numerals have been applied, with the understanding that these elements are similar to the elements previously described with respect to the same reference numerals.

In the embodiment of FIG. 7 the chamber 17 is shown as having a molded top closure structure 112. In this instance, the domed cap 50 is sealed by an O-ring 67 that is inserted into the chamber 69, where the chamber 69 is formed in the chamber 17. The closure structure has an integrally formed raised boss 114 with a smaller diameter support pin 116 that projects upwardly from the boss 114 so that the head 118 of the pin substantially fills the top of the recess 53. Vent holes 120, 122 are provided in the closure structure 112, so that when the cap 50 is unscrewed the pressure in the chamber 17 may be released. The domed cap 50 and the boss 114 are sealed by means of a circular O-ring 124 that surrounds the pin 116.

Referring to FIGS. 8–12, there is shown a second embodiment of an inline dispersal valve. In the embodiment of FIGS. 8–12 the chemical dispersant can be stored in a keyed canister to prevent inadvertent placing the wrong chemical dispersant into the dispersal valve. A further advantage of the canister is that the dispersant chemicals can be inserted without any bodily contact of the operator.

Figure 8:
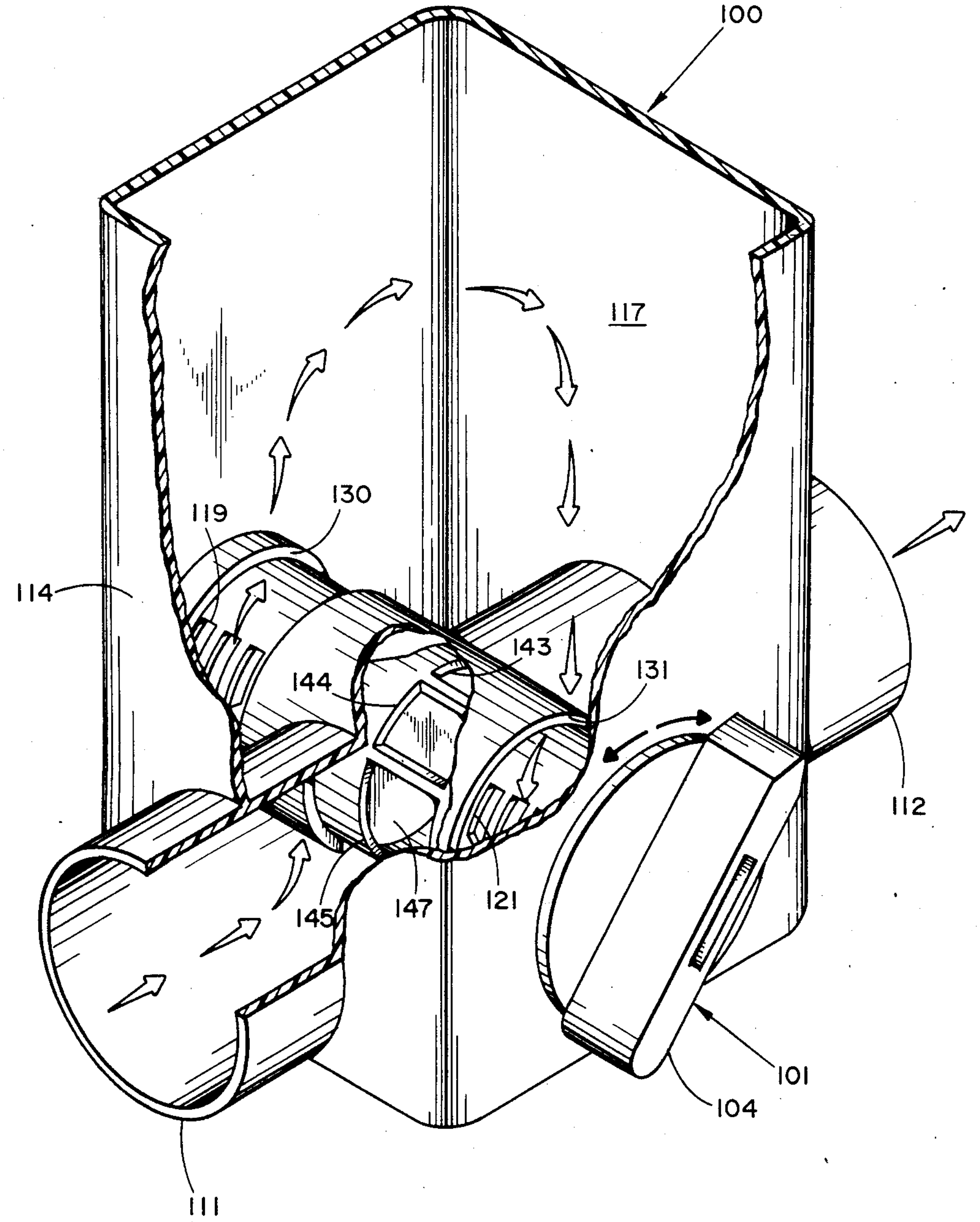
FIG. 8 is a partial cutaway of a second embodiment of the present invention showing overall fluid flow and general operation.
Figure 11:
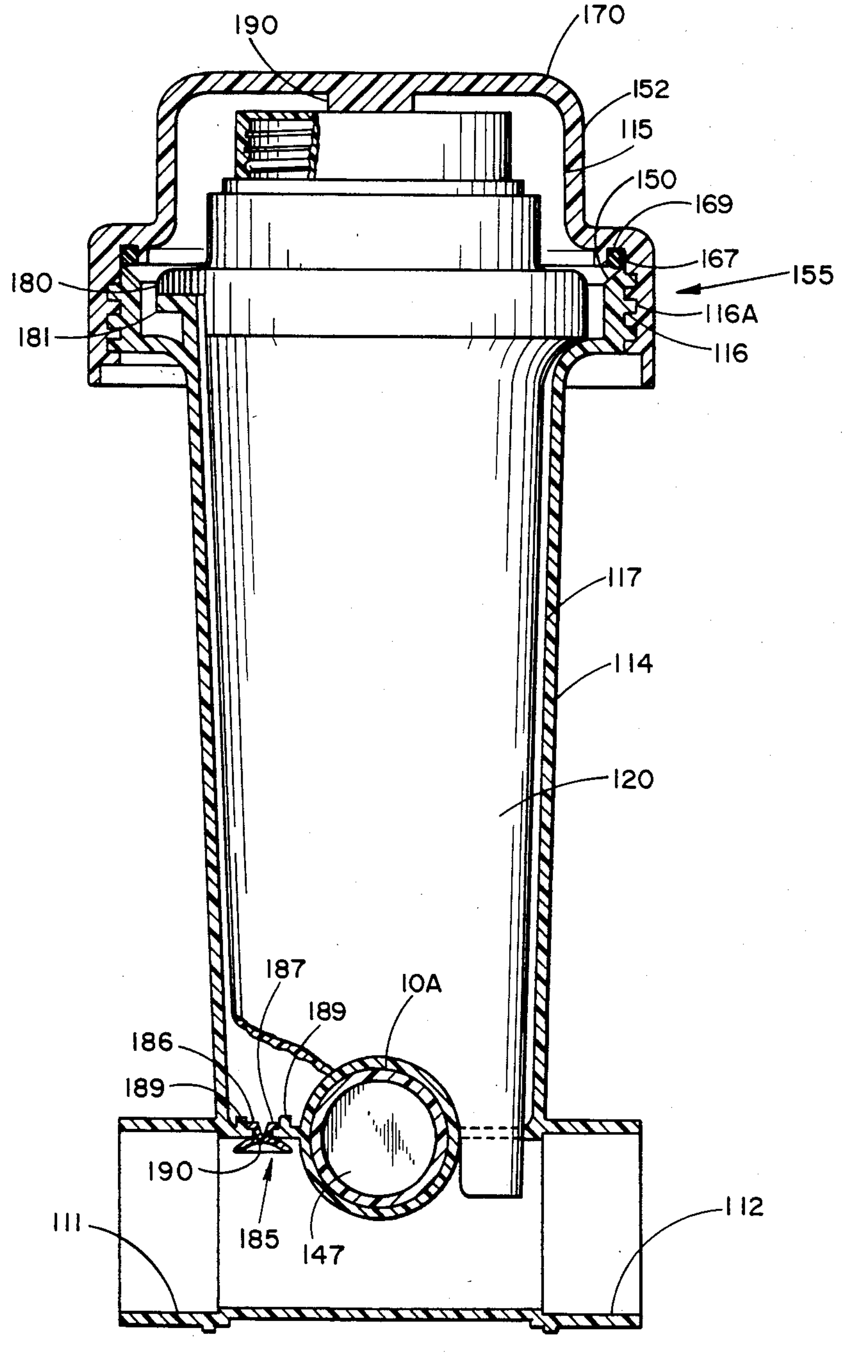
FIG. 11 is a side sectional view of valve and chamber with keyed chemical canister inserted and partially cut away of the embodiment of FIG. 8.

FIG. 8 of the drawing shows a dispersal valve 100 controlled by a rotatable plug 101. The dispersal valve 100 includes an input connecting pipe 111, an output connecting pipe 112 and a vertical collar 114, all of which are integrally formed as one part. The input pipe 111 and the output pipe 112 may be connected to a system pipe by means of threaded connections, adhesive or any other suitable means. Although one pipe has been designated as an input and the other as an output the internal symmetry of my valve permits its operation in either direction. Vertical collar 114 extends upward to a circular lip 15 that has internal threads 116 formed thereon which mate with threads on a cap 115 that threadingly engage with threads 116 (FIG. 11).

Figure 9:
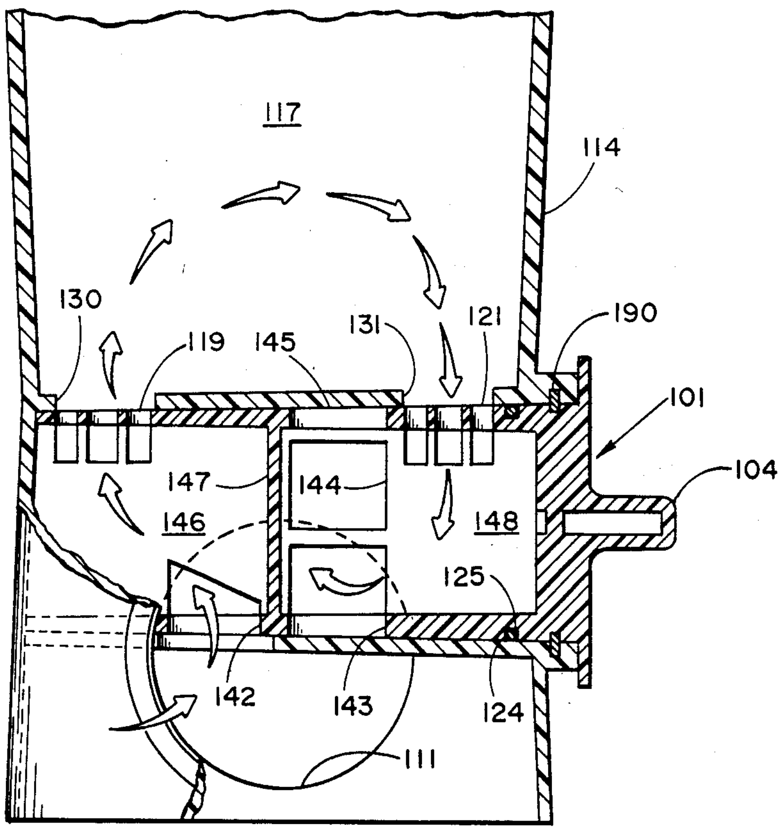
FIG. 9 is a side sectional view of the valve of FIG. 8 which shows the dispersant chamber and fluid flow.
Figure 10:
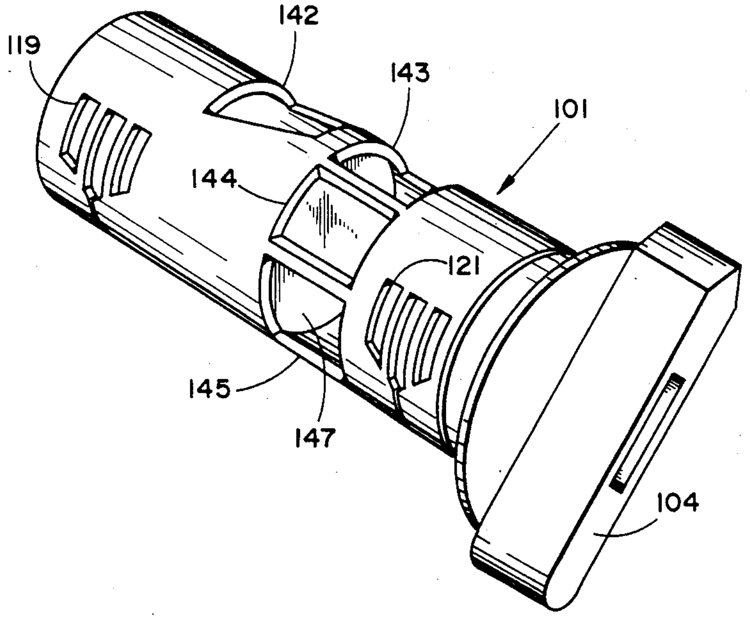
FIG. 10 is a view of the plug and hole pattern of plug with O ring seal of the embodiment of FIG. 8.

FIG. 9 shows an elongated, vertically oriented chamber 117 to hold the dispersant which typically may be bromine or chlorine tablets of the type conventionally used for swimming pools, spas, hot tubs and the like. If desired a chemical canister having a keyed section which mates to the inside of container can be used to hold the chemical dispersant in chamber 117. The purpose of use of an internal canister is to prevent the chemical dispersant in the canister from making bodily contact with the operator. Referring to FIGS. 8 and 9 the control plug 101 has an elongated handle 104 that extends across the end of plug 101 to permit rotation of plug 101.

Typically, plug 101 is made with a tapered section as illustrated in FIG. 9. The tapered section permits plug 101 to be inserted into a mating tapered housing in valve 100. The control plug 101 which is located in a tapered mating recess that is located partly above fluid line 142 and partly in fluid line to permit the openings in the plug valve 110 to be in line with the fluid flowing through valve 100. The direction of the fluid as it flows through control plug 101 is shown by the arrows in FIGS. 8 and 9. The amount of fluid that flows through the apertures 119 and 121 is controlled in accordance with the total area that is available to the fluid flow port apertures 130 and control plug aperture 121 and port aperture 131 in chamber 114.

Figure 13:
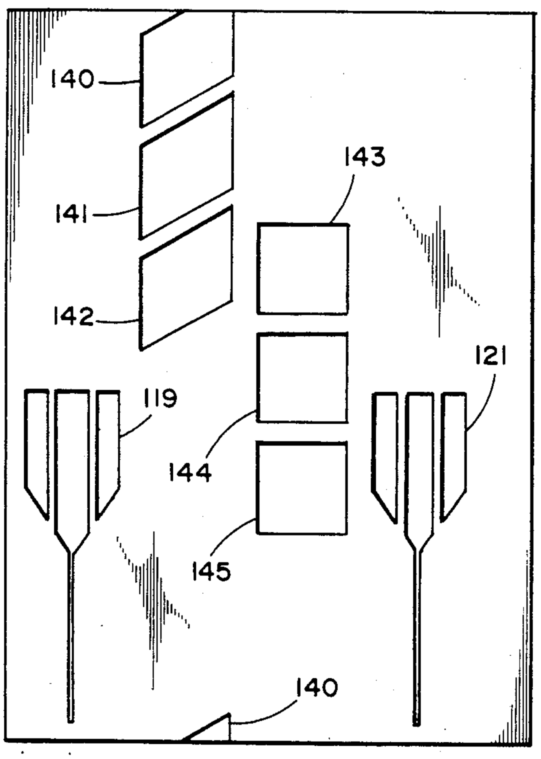
FIG. 13 is the inline dispersal valve in a planer projection to illustrate the shape of the openings.

FIG. 13 shows control plug apertures 119 and 121 in a rolled out view. Control plug apertures 119 and 121 each comprise three parallel slots or ranges or openings. The middle slot comprises a frontal, narrow, elongated range or first adjustment range, which extends for about 90° around the rotatable plug and which is the first range through which the fluid flows as the rotatable plug is rotated from a closed to an open position. The middle parallel slot also comprises a pointed, rearward, larger opening which extends a further 90° around the rotatable plug from the first adjustment range. Two further pointed, parallel, larger openings are located on either side of the middle, rearward, larger opening and also extend for about 90° around the rotatable plug from the first adjustment range. The three pointed, parallel, larger openings or larger adjustment range comprise a greater total area than the first adjustment range, thereby allowing a greater amount of fluid to flow through the control plug apertures 119 and 121.

FIG. 13 shows the control plug 100 has a particular hole pattern formed in it prior to assembly as also shown in the rolled out view of the surface of plug 100. The openings 140, 141, and 142 permit fluid to flow into the left chamber 146 from pipe 142 while the opening 143, 144 and 145 permit fluid to flow back into pipe 111. FIG. 9 shows a circular wall 147 extends between chambers 146 and 148 to prevent the axial flow of fluid from one chamber to another. The adjustment of the position of the control apertures 121 with respect to the port apertures 131 and control aperture 119 with port aperture 130 will be described subsequently in more detail. Plug 101 includes a circular O-ring 124 that is located in a circular cavity 125 formed on the plug valve 110 to provide a fluid seal between the plug valve 101 and housing 114. O-ring 124 comprises a two-part member having a rubber inner member and an outer teflon top. Sufficient clearance is allowed so that plug 101 may rotate.

As shown in FIGS. 8 and 9 fluid enters the inline dispersal valve 100 through an input connecting pipe 111 with the arrows indicating the flow of the fluid upward through opening 142 into chamber 146. Flow then flows through the port aperture 119 and port aperture 130. The port aperture 119 directs the fluid into chamber 117 where it swirls around a dispersant located therein (not shown). The amount of dispersant which is to be dissolved or mixed is controlled by the open areas into one of chamber 117 which are provided by the alignment of the port apertures 119 with apertures 120 and port aperture 121 with aperture 131. After the fluid flow over the material to be dispersed, the fluid flows into the port 131 and port 121 (indicated by the arrows)

and into chamber 148. The fluid that flows in an outlet aperture which faces the direction away from the incoming fluid (downstream). Since the orientation of the inlet 114 faces upstream and the outlet 143 faces downstream, it produces a flow of fluid from the inlet to the outlet.

To control or adjust the amount of fluid that flows through dispersal valve 100 one rotates plug valve 101 to adjust the position of the control apertures 119 and 121 relative to the port apertures openings 130 and 131 in housing 114. A handle 104 is provided to permit rotation of control plug 104. As control plug 101 is rotated in one direction it increases amount of open area to chamber 117 and when control plug 101 is rotated in the opposite direction it decreases the amount of open area to chamber 117.

Referring to FIG. 11 it shows the top of the chamber 117 covered by a removable screw cap 155 which prevents gasses from escaping out of chamber 117. The screw cap 115 preferably has a domed section 152 for holding the top of a canister 120 in place in chamber 117. A downwardly depending side wall 155 located on the side of cap 155 has threads 116 that mate with a set of threads 116A on housing 114 to securely hold the domed cap 155 on housing 114. Located in a cavity 169 in cap 115 is an O-ring 167 which forms a fluid seal against tapered annular seat seal 150 to prevent fluid from escaping between threads 116 and 116A. The tapered annular seat 150 is angled inward so that when cap 115 is screwed on the O-ring 167 is squeezed inward and wedged tightly against the surface of flat annular seat 150 to prevent escape of fluids therepast and make it easier to keep the seat clean.

Figure 12:
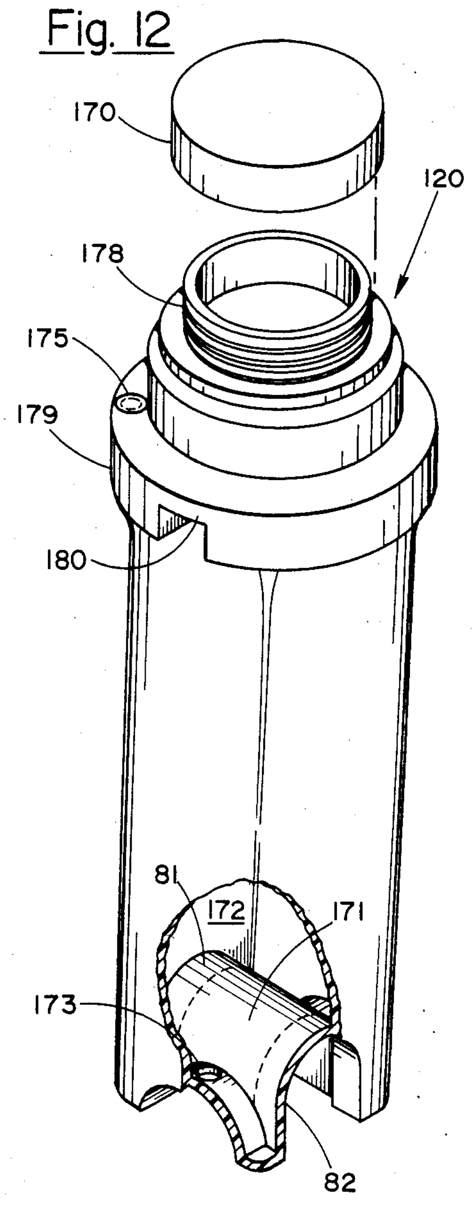
FIG. 12 is a view of the chemical chamber to be inserted into the chamber of the inline dispersal valve of FIG. 8 showing a pressure valve and a keyed top.

FIG. 11 and FIG. 12 shows the chemical canister 120 for use in my invention. FIG. 12 shows the canister with its top removed; however, in the preferred use of canister the top of canister 120 would be permanently secured to canister 120 to prevent unauthorized access to the contents of canister 120. In order to accidentally prevent inserting the wrong chemical into my dispersal valve I provide a keyed shape 180 in ledge 179 on canister 120. The keyed shape which is a slot that fits around a mating keyed male member 181 on housing 117. While the canister 120 permits the operator to install the chemicals into valve 100 without physically touching the chemicals the keying of the canister to the housing permits only one shape canister to be inserted into the dispersal valve as each canister for a specific chemical is keyed differently. Therefore, one can be assured that the hazard of inserting an improper chemical into the valve will be virtually eliminated. FIG. 12 shows the bottom of canister 120 contains a foil covering 171 which is typically adhesively fastened to housing 1. While foil is shown, other means could be used to seal canister 120. Before the canister 120 is inserted into a dispersal valve the foil 171 is removed to permit fluid to enter canister chamber 172.

Located on the bottom of canister 120 is an opening to permit fluid to drain or enter valve 100. While located on top of canister is a rupturable seal 175 that permits air to enter canister 120 when seal 175 is broken. Typically seal 175 may be a metal foil or the like or a weakened section of canister 120 that one could pierce out with a sharp instrument.

Figure 14:
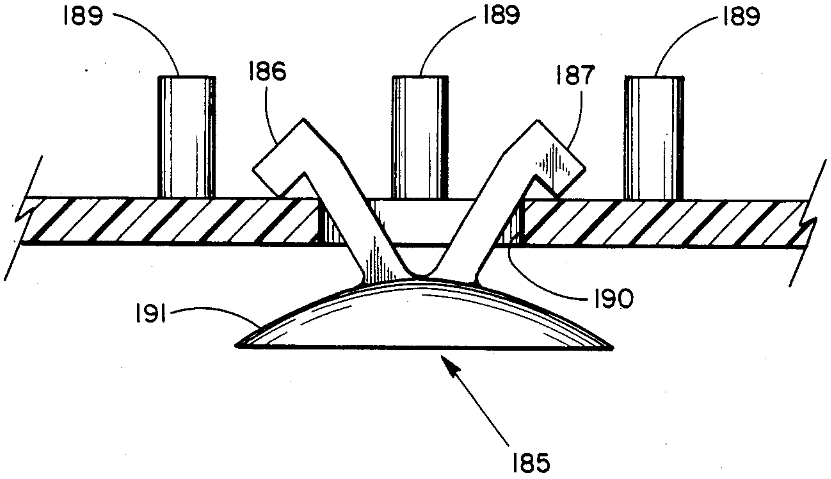
FIG. 14 shows a side view of the pressure relief valve of the embodiment of FIG. 11.

Referring to FIG. 11 and FIG. 14 there is shown a vertically slidable pressure relief valve 185 that comprises resilient legs 187 and 186 and a resilient member 191 that coact to hold valve in the up position thereby causing the hemispheral head member 191 to form sealing engagement around opening 190. FIG. 14 shows the relief valve 185 in the open position with arrows indicating fluid flow past valve 185. When the fluid ceases to flow past opening 190 the natural resiliency in legs 186 and 187 pull valve head 191 up to opening 190. In the up condition a higher pressure below opening 190 will close the valve 185 while a higher pressure above valve 185 will force valve 185 down as shown in FIG. 14 to thereby permit escape of fluid. Located around the opening 190 are a series of pegs 189 which prevent the dispersant from forcing valve 185 downward.

I claim:

1. An inline dispersal valve for metering the amount of material that is dispersed into a fluid stream comprising:

(a) a chamber having a contoured bottom, said chamber containing a removable canister for holding material to be dispersed into a fluid stream, said canister having a keyed section and said chamber having a keyed section to mate with said keyed section of said canister, said canister having a contoured bottom for mating with said contoured bottom of said chamber;

(b) a closure on said chamber to permit insertion of said canister into said chamber, said closure including a member for holding said contoured bottom of said canister against said contoured bottom of said chamber;

(c) a rotatable plug located in said countoured bottom of said chamber, said rotatable plug having a first opening for controlling, restricting and directing fluid away from the fluid stream into said canister to permit the directed fluid to dissolve a dispersant in said canister into the fluid stream, said rotatable plug having a cylindrical surface for forming rotational engagement with a cylindrical receptacle in said chamber, said rotatable plug having a second opening for controlling, restricting, and directing the fluid containing the dispersant back into the fluid stream.

2. An inline dispersal valve for metering the amount of material that is dispersed into a fluid stream comprising:

(a) a chamber for holding material to be dispersed into a fluid stream, said chamber comprising an input connecting pipe coupled to receive the fluid stream, an output pipe coupled to emit the fluid stream, an inlet port aperture that is located closer to said input pipe than said output pipe, an outlet port aperture that is located closer to said output pipe than said input pipe, said chamber including means for fastening a cap thereto;

(b) a cap for closing said chamber, said cap having means to engage said means for fastening a cap thereto to thereby secure said cap to said chamber;

(c) a pressure relief valve to vent pressure from said chamber into the fluid stream; and (d) a rotatable plug, said rotatable plug having a first opening for directing fluid from the fluid stream through said input port aperture and into said chamber to permit the directed fluid to dissolve a dispersant in said chamber, said rotatable plug further having a second opening for controlling and directing the fluid containing the dissolved dispersant from said chamber through said output port aperture and back into the fluid stream, each said first and second openings including a set of control plug apertures, each said set of control plug apertures having a first adjustment range and a larger adjustment range, said first adjustment range allowing a lesser quantity of fluid through said control plug apertures than said larger adjustment range, said first adjustment range and said larger adjustment range allowing greater quantities of fluid through said control plug apertures as said rotatable plug is rotated from a closed position.

3. The invention of claim 2 including a second pressure relief valve located at the top of said inline dispersal valve, said second pressure relief valve operable to be opened so as to relieve pressure and disperse pressurized gas or fluid from said chamber.

4. The invention of claim 2 wherein said pressure relief valve comprises a resilient member to form sealing engagement with an opening in said chamber, said pressure relief valve connecting to said chamber to prevent pressurized fluid from the fluid stream from entering said chamber when said first pressure relief valve releases the pressure in said chamber.

5. The invention of claim 2 wherein the first opening is isolated from the second opening in said rotatable plug.

6. The invention of claim 2 wherein said rotatable plug has a tapered cylindrical surface for forming rotational engagement in an opening in said inline dispersal valve.

7. The invention of claim 2 wherein said inline dispersal valve includes an annular tapered sealing seat and a rotatable cap for forming sealing engagement with said annular tapered sealing seat.

8. The invention of claim 2 wherein said first adjustment range includes a range having a narrow, elongated opening and said larger adjustment range includes a range having a larger opening than said narrow, elongated opening.

9. The invention of claim 2 wherein said first adjustment range extends for about 90° around said rotatable plug and said larger adjustment range extends for a subsequent 90° around said rotatable plug so that upon rotating said rotatable plug from a closed position the fluid contacts said first adjustment range before said larger adjustment range.

10. An inline dispersal valve for metering the amount of material that is dispersed into a fluid stream comprising:

(a) a chamber for holding material to be dispersed into a fluid stream, said chamber comprising an input connecting pipe coupled to receive the fluid stream, an output pipe coupled to emit the fluid stream, an inlet port aperture that has an axis positioned substantially normal to the flow direction of the fluid stream and is located closer to said input pipe than said output pipe, an outlet port aperture that has an axis positioned substantially normal to the flow direction of the fluid stream and is located closer to said output pipe than said input pipe and a tapered, cylindrical receptacle, said chamber including means for fastening a cap thereto;

(b) a cap for closing said chamber, said cap having means to engage said means for fastening a cap thereto to thereby lock said cap to said chamber;

(c) a first pressure relief valve and a second pressure relief valve located in said chamber, said first pressure relief valve operable to be opened so as to relieve pressure and disperse pressurized gas or fluid from said chamber, said second pressure relief valve comprising a resilient member to form sealing engagement with an opening in said chamber, said second pressure relief valve connecting to said chamber to prevent pressurized fluid from the fluid stream from entering said chamber when said first pressure relief valve releases the pressure in said chamber;

(d) a rotatable plug comprising a tapered cylindrical surface for forming rotational engagement in said chamber and matable to said tapered, cylindrical receptacle in said chamber, said rotatable plug having a first opening for directing fluid from the fluid stream through said input port aperture and into said chamber to permit the directed fluid to dissolve a dispersant in said chamber, said rotatable plug having a second opening for controlling and directing the fluid containing the dissolved dispersant from said chamber through said output port aperture and back into the fluid stream, said rotatable plug located at least partially in the fluid stream.

11. The invention of claim 10 wherein said rotatable plug extends approximately halfway into the fluid stream to permit removal and return of fluid to the fluid stream.

* * * * *